United States Patent [19]

Kikuchi

[11] 4,320,495

[45] Mar. 16, 1982

[54] TONE ARM RETURN SYSTEM FOR RECORD PLAYER WITH ECCENTRIC SPINDLE HOLE IMMUNITY

[75] Inventor: Takashi Kikuchi, Tokorozawa, Japan

[73] Assignee: Pioneer Electronic Corporation, Tokyo, Japan

[21] Appl. No.: 890,760

[22] Filed: Mar. 27, 1978

[30] Foreign Application Priority Data

Mar. 26, 1977 [JP] Japan ............................... 52-33880

[51] Int. Cl.³ ............................................ G11B 17/06
[52] U.S. Cl. .................................................. 369/226
[58] Field of Search .................................. 274/1 L, 15

[56]  References Cited

U.S. PATENT DOCUMENTS

| 3,599,984 | 8/1971 | Tatsuo | 274/1 L |
| 3,717,818 | 2/1973 | Herbst | 307/353 X |
| 3,820,033 | 6/1974 | Iwata | 307/353 |
| 3,937,903 | 2/1976 | Osann | 274/15 R X |
| 3,976,947 | 8/1976 | Goyot et al. | 328/114 X |
| 4,041,404 | 8/1977 | Lewis | 328/114 X |

Primary Examiner—Charles E. Phillips
Attorney, Agent, or Firm—Sughrue, Mion, Zinn, Macpeak and Seas

[57]  ABSTRACT

A first generator 1 produces a continuously increasing signal corresponding to the tone arm pick-up stylus position, and a second generator 2 produces a synchronizing signal comprising a pulse for each turntable rotation. The synchronizing pulses alternately gate the position signal between a pair of parallel peak holding circuits 5a, 5b whose differential output S is compared with a reference signal T, and when the former exceeds the latter the tone arm is returned. Any cyclical variations in the position signal due to the eccentricity of the record spindle hole are self-cancelling during the differential comparison because their magnitudes are substantially the same when sampled during the same relative periods of the turntable rotation cycle. The high pitch of the lead-out groove at the end of the record play produces a large differential output signal, to thereby trigger the tone arm return.

3 Claims, 6 Drawing Figures

TONE ARM RETURN SYSTEM FOR RECORD PLAYER WITH ECCENTRIC SPINDLE HOLE IMMUNITY

BACKGROUND OF THE INVENTION

This invention relates to a method and apparatus for detecting the end of a performance in a record player by discriminating variations in the pitch of the record groove.

With a record player, reproduction is carried out by moving a pick-up cartridge needle along the spiral groove of a record placed on a rotating turntable. Most modern record players employ automatic tone arm return systems. In one of such systems the tone arm return is initiated by detecting the arrival of the pick-up at a position which lies at a predetermined distance from the center of the turntable. In another system the increased pitch of the lead-out groove of a record is utilized. That is, increments in the differentiated output of a signal which varies in correspondence to the radial movement of the pick-up are detected to thereby discriminate the end of a performance and return the tone arm.

The former system is disadvantageous in that when a record whose lead-out groove is relatively close to the outer circumference is used, the automatic return function does not work. In contrast, when a record whose lead-out groove is relatively close to the center is used, the tone arm will be returned before the performance is ended.

In the latter system if the spindle hole in the center of the record is not exactly coincident with the center of the recording groove, the tone arm oscillates one cycle during each revolution of the record due to the eccentricity of the hole. As a result, the output signal corresponding to the position of the pick-up also varies or oscillates. Accordingly, if an increment of the radial pick-up movement speed is detected by differentiating this signal, an output increment $Q_1$ (FIG. 1) obtained when the signal varies in a positive direction due to the eccentricity of the record is greater than the average increment $Q_2$, and such an artificially high differentiation output leads to a premature and erroneous return operation.

SUMMARY OF THE INVENTION

Briefly, and in accordance with the present invention, the drawbacks and disadvantages of the prior art are effectively overcome by generating a continuously increasing signal corresponding to the tone arm pick-up stylus position, and a synchronizing signal comprising a pulse for each turntable rotation. The synchronizing pulses alternately gate the position signal between a pair of parallel peak holding circuits whose differential output is compared with a reference signal, and when the former exceeds the latter the tone arm is returned. Any cyclical variations in the position signal due to the eccentricity of the record spindle hole are self-cancelling during the differential comparison because their peak magnitudes are substantially the same during the same relative periods of the turntable rotation cycle. The high pitch of the lead-out groove at the end of the record play produces a large differential output signal, to thereby trigger the tone arm return.

DETAILED DESCRIPTION OF THE PREFERRED EMBODIMENT

Figure 1:
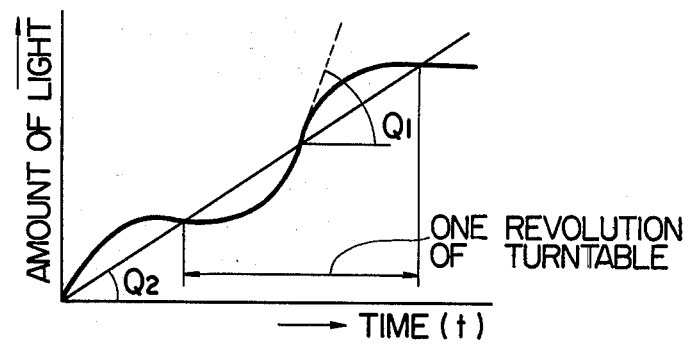
FIG. 1 shows a graphical representation of the tone arm return signal characteristics in a conventional record player.
Figure 2:
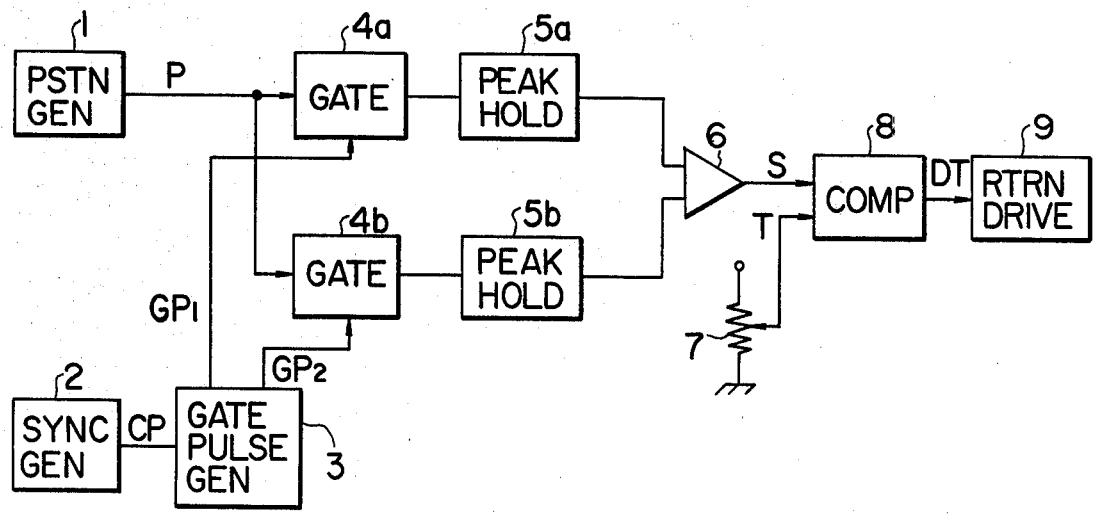
FIG. 2 shows a block diagram of a record player tone arm return system according to this invention.

Referring to FIG. 2, a pick-up position signal generator 1 is adapted to generate a position signal P. The generator 1 may comprise a photo-coupler system, for instance, in which the quantity of light applied to a receiving element is controlled by a shutter which is turned in association with a rotary tone arm shaft. A synchronizing signal generator 2 is adapted to generate a pulse CP in synchronization with each revolution of a turntable. The generator 2 may operate by detecting light reflected by a small area on the bottom of the turntable, or by subjecting an oscillating motor drive signal to frequency division. A gate pulse generator 3 alternately produces gate pulses $GP_1$ and $GP_2$ when the synchronizing pulse CP is applied thereto. A first gate 4a passes the position signal P to its output when the gate pulse $GP_1$ is applied thereto. Similarly, a second gate 4b passes the position signal P in response to the gate pulse $GP_2$. First and second peak holding circuits 5a and 5b receive the outputs of the first and second gates 4a and 4b, respectively. The outputs of the first and second peak holding circuits are subjected to comparison by a difference detector 6, to thereby provide a difference signal S. A reference value setting variable resistor 7 is adapted to generate a reference signal T. A comparator 8 generates a lead-out groove detection signal DT only when the absolute value of the difference signal S is greater than the reference signal T. A drive section 9 implements the tone arm return in response to the lead-out groove detection signal DT. In operation, the pick-up stylus at the end of the tone arm is placed in the groove of a record on the turntable to perform reproduction, and the tone arm, being guided by the groove spiral, is gradually swung toward the center of the record. A light shielding plate turned in association with the tone arm controls the quantity of light applied to the position signal generator 1, and such light quantity increases as play continues and the tone arm advances radially toward the record center. If the spindle hole is properly centered, i.e. not eccentric, a linear light quantity increase results, as shown by line A in FIG. 3(a), and a corresponding linearly increasing position signal P is produced by the generator 1. On the other hand, if the spindle hole is eccentric, a cyclical variation component whose amplitude is proportional to the amount of eccentricity is added, and the resultant light quantity increase varies as indicated by curve B in FIG. 3(a).

Figure 3A:
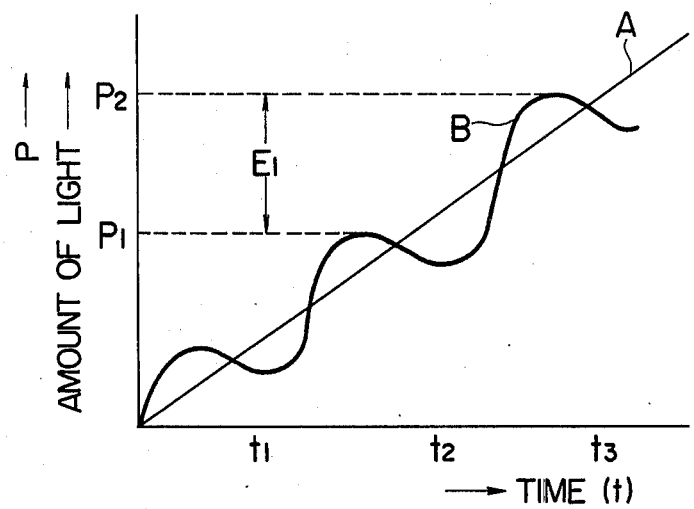
FIGS. 3(a)-3(d) show various waveform diagrams for describing the operation of the circuit shown in FIG. 2.
Figure 3B:
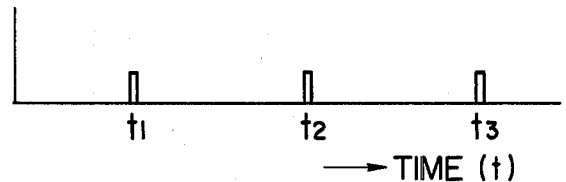
Figure 3C:
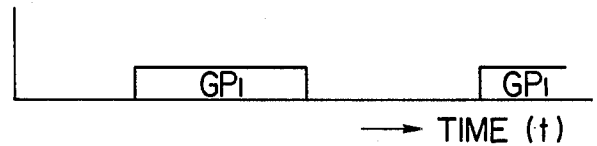
Figure 3D:
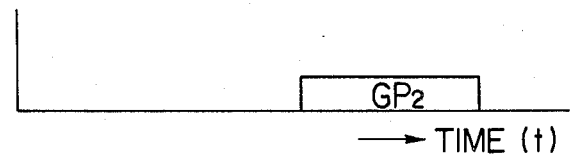

The synchronizing signal generator 2 generates synchronizing pulses $CP_1$, $CP_2$ and $CP_3$ at time instants $t_1$, $t_2$ and $t_3$, as shown in FIG. 3(b), with the period between such pulses corresponding to a turntable revolution. When the synchronizing pulses $CP_1$–$CP_3$ are applied to the gate pulse generator 3, gate pulses $GP_1$ and $GP_2$ are alternately generated as shown in FIGS. 3(c)

and 3(d), respectively, and applied to the first and second gates 4a and 4b. The position signal P corresponding to one revolution of the turntable is thus passed through the first gate 4a, the position signal corresponding to the next revolution of the turntable is passed through the second gate 4b, and so on in an alternate manner. The ouput signals of the first and second gates are applied to the first and second peak holding circuits 5a and 5b, respectively, where the maximum values of the positions signals P are continuously held and outputted. That is, the maximum value $P_1$ of the position signal (see FIG. 3(a)) during one revolution of the turntable and the maximum value $P_2$ of the position signal during the next revolution of the turntable are successively held. As a result, the stored values of the two position signals correspond to their maximum values during their respective revolutions of the turntable, including the maximum values caused by any variations due to record eccentricity. Since such variation components are substantially constant if sampled at the same times, no signal differential due to record eccentricity is involved between the stored peak values. The outputs of circuits 5a and 5b are compared with each other in the difference detector 6, as a result of which a difference signal $E_1$ indicated in FIG. 3(a) is successively obtained. Since no variation component due to record eccentricity is involved, the difference signal S outputted by the detector 6 corresponds only to the record groove pitch. The difference signal S is then compared with the reference signal T in the comparator 8, and the lead-out groove detection signal DT is produced only when the difference signal exceeds the reference signal. Accordingly, if the reference signal T is set at a value corresponding to a pitch lower than the record lead-out groove pitch, the arrival at and travel of the pick-up in the lead-out groove can be positively detected and the drive section 9 actuated in response thereto to implement the tone arm return.

In the above description the pick-up position detector is photo-electric, but any equivalent type of device may be employed which can provide a signal corresponding to the position of the pick-up. Furthermore, the peak holding circuits may obviously be replaced by circuits which hold minimum signal values.

What is claimed is:

1. A tone arm return system for a record player, comprising:
   (a) means for generating a continuous signal whose amplitude is proportional to the radial position of a pick-up stylus mounted on a tone arm with respect to a spindle in the center of a rotating turntable, the pick-up stylus following a spiral groove in a record disposed on the turntable,
   (b) means for generating a train of equally spaced synchronizing pulses individually corresponding to a revolution of the turntable,
   (c) means for comparing the maximum or minimum value of the position signal between consecutive first and second synchronizing pulses with the maximum or minimum value thereof, respectively, between consecutive second and third synchronizing pulses, said comparing means comprising a pair of parallel peak or valley holding circuits and a differential comparator connected to their outputs,
   (d) gate means responsive to the synchronizing pulses for alternately coupling the position signal to the respective holding circuits, and
   (e) means for returning the tone arm to a rest position in response to the comparison value exceeding a predetermined reference value.

2. A tone arm return system as defined in claim 1, wherein the returning means comprises a comparator having one input supplied with the comparison value and another input supplied with the reference value, and a tone arm drive device coupled to the output of the latter comparator.

3. A method for returning the tone arm of a record player, comprising the steps of:
   (a) generating a continuous signal whose amplitude is proportional to the radial position of a pick-up stylus mounted on a tone arm with respect to a spindle in the center of a rotating turntable, the pick-up stylus following a spiral groove in a record disposed on the turntable,
   (b) generating a train of equally spaced synchronizing pulses individually corresponding to a revolution of the turntable,
   (c) alternately coupling the position signal to a pair of parallel holding circuits in response to the synchronizing pulses,
   (d) differentially comparing the outputs of the holding circuits to thereby compare the maximum or minimum value of the position signal between consecutive first and second synchronizing pulses with the maximum or minimum value thereof, respectively, between consecutive second and third synchronizing pulses, and
   (e) returning the tone arm to a rest position in response to the comparison value exceeding a predetermined reference value.

* * * * *